(12) United States Patent
Karon

(10) Patent No.: US 10,609,329 B2
(45) Date of Patent: Mar. 31, 2020

(54) VIRTUAL MEETING SYSTEM AND METHOD FOR FACILITATING EYE CONTACT

(71) Applicant: BVS, Inc., Cedar Rapids, IA (US)

(72) Inventor: Roy Karon, Cedar Rapids, IA (US)

(73) Assignee: BVS, Inc., Cedar Rapids, IA (US)

( * ) Notice: Subject to any disclaimer, the term of this patent is extended or adjusted under 35 U.S.C. 154(b) by 0 days.

(21) Appl. No.: 16/279,170

(22) Filed: Feb. 19, 2019

(65) Prior Publication Data

US 2019/0260962 A1    Aug. 22, 2019

Related U.S. Application Data

(60) Provisional application No. 62/632,196, filed on Feb. 19, 2018.

(51) Int. Cl.
*H04N 7/14* (2006.01)
*H04N 5/225* (2006.01)

(52) U.S. Cl.
CPC .......... *H04N 7/142* (2013.01); *H04N 5/2253* (2013.01); *H04N 5/2254* (2013.01)

(58) Field of Classification Search
CPC ...................................................... H04N 7/14
See application file for complete search history.

(56) References Cited

U.S. PATENT DOCUMENTS

| | | | | |
|---|---|---|---|---|
| 8,780,167 B2* | 7/2014 | Daddi | ................... | A47C 31/00 348/14.04 |
| 8,902,281 B2* | 12/2014 | Bolle | .................... | H04N 7/142 348/14.07 |
| 9,330,589 B2* | 5/2016 | Cope | ..................... | G06F 3/1454 |
| 9,615,054 B1* | 4/2017 | McNelley | .............. | H04N 7/144 |
| 2007/0008344 A1* | 1/2007 | Medina | ..................... | G06T 3/00 345/647 |
| 2010/0171012 A1* | 7/2010 | Tseng | ....................... | A47B 9/14 248/188.2 |
| 2010/0238265 A1* | 9/2010 | White | ................... | H04N 7/144 348/14.16 |
| 2014/0339859 A1* | 11/2014 | Holland | ................... | A47C 3/34 297/19 |
| 2017/0223312 A1* | 8/2017 | McNelley | ................ | H04N 7/15 |

* cited by examiner

*Primary Examiner* — Olisa Anwah
(74) *Attorney, Agent, or Firm* — Simmons Perrine Moyer Bergman PLC

(57) ABSTRACT

The present invention is an apparatus and method for facilitating eye contact in a virtual meeting system where at least one of the meeting participants drags and drops a window of a projected image of another remote meeting participant to a location on a portion of a two-way mirror so that said projected image is along a line of sight and between the viewer and a camera disposed behind the two-way mirror.

14 Claims, 13 Drawing Sheets

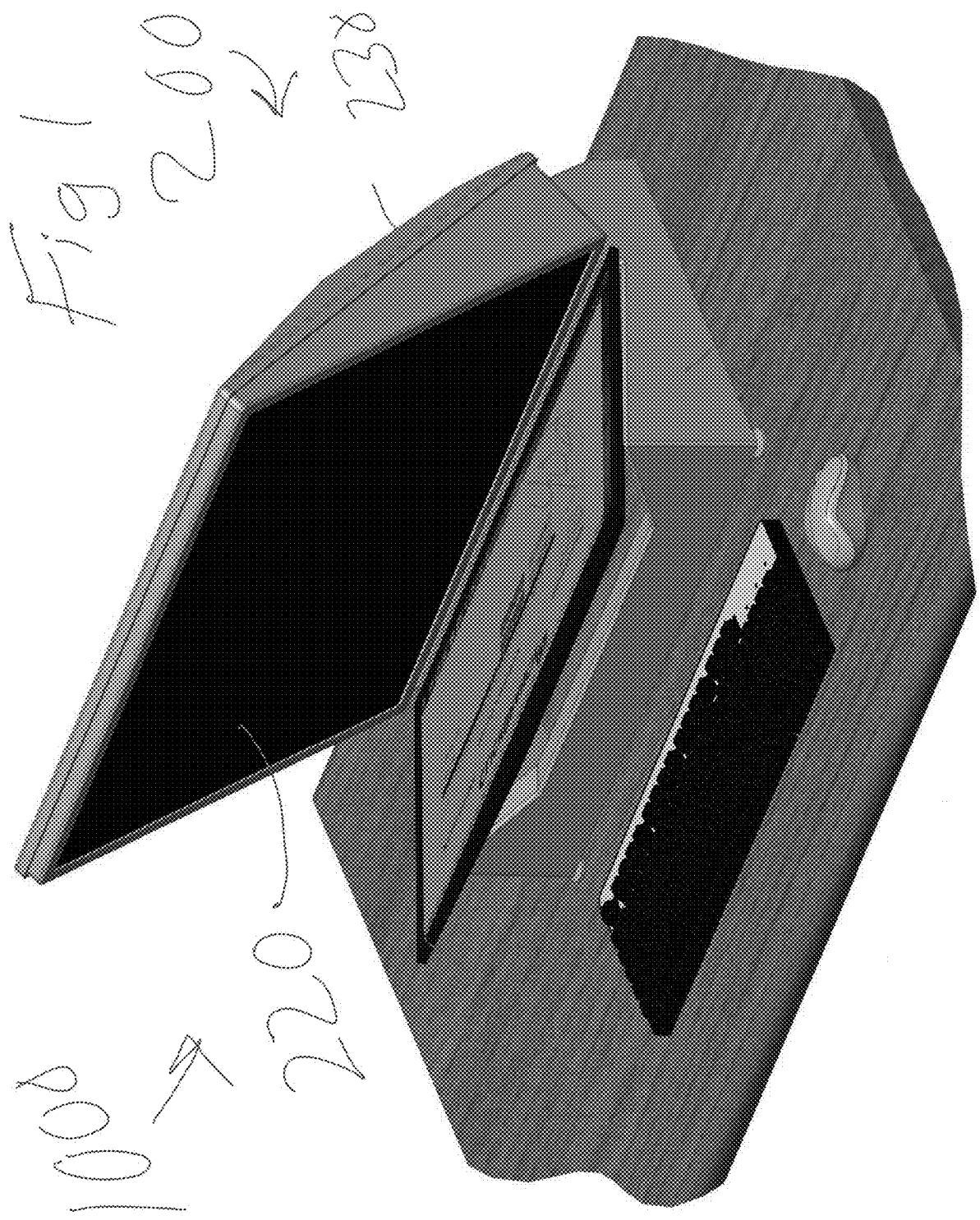

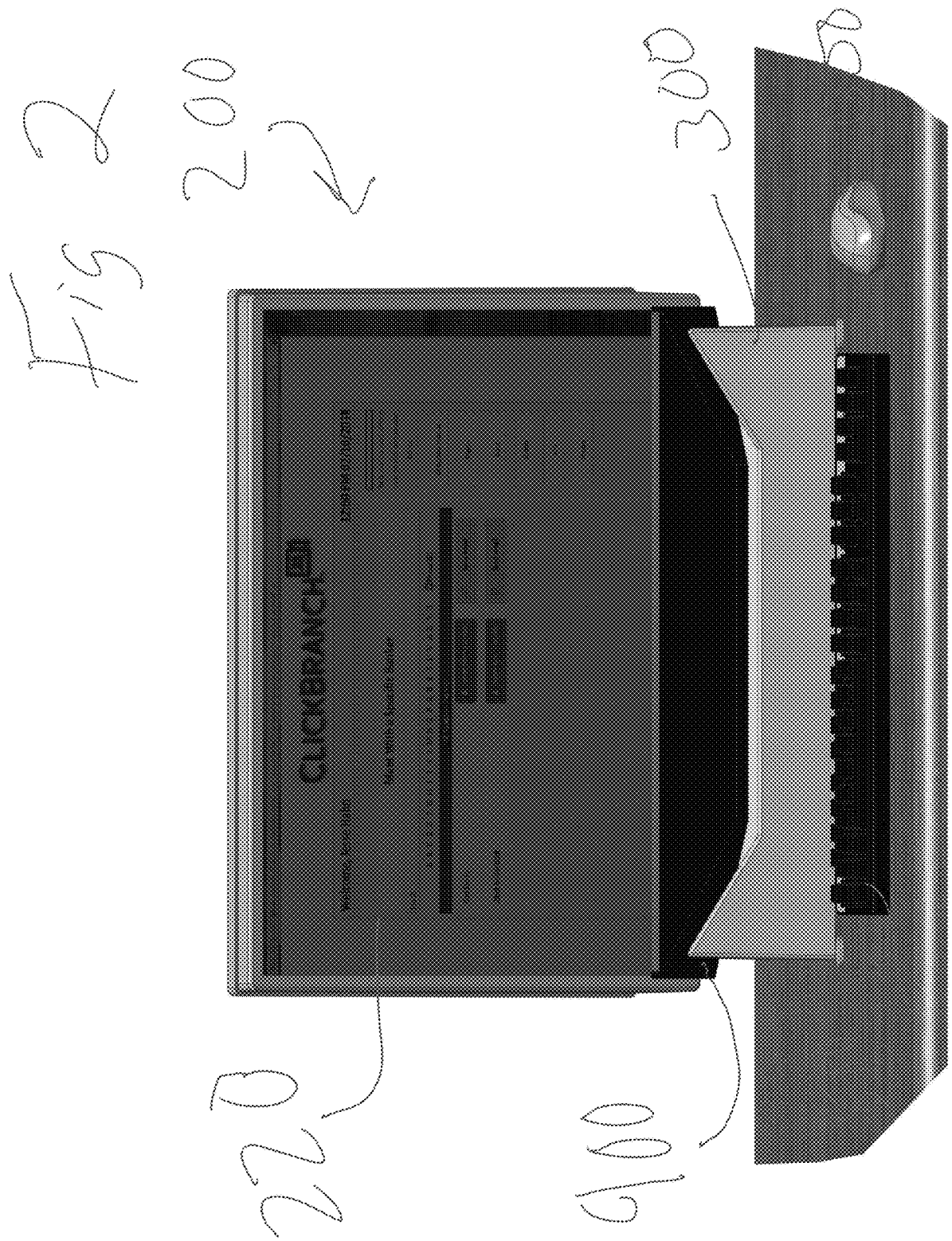

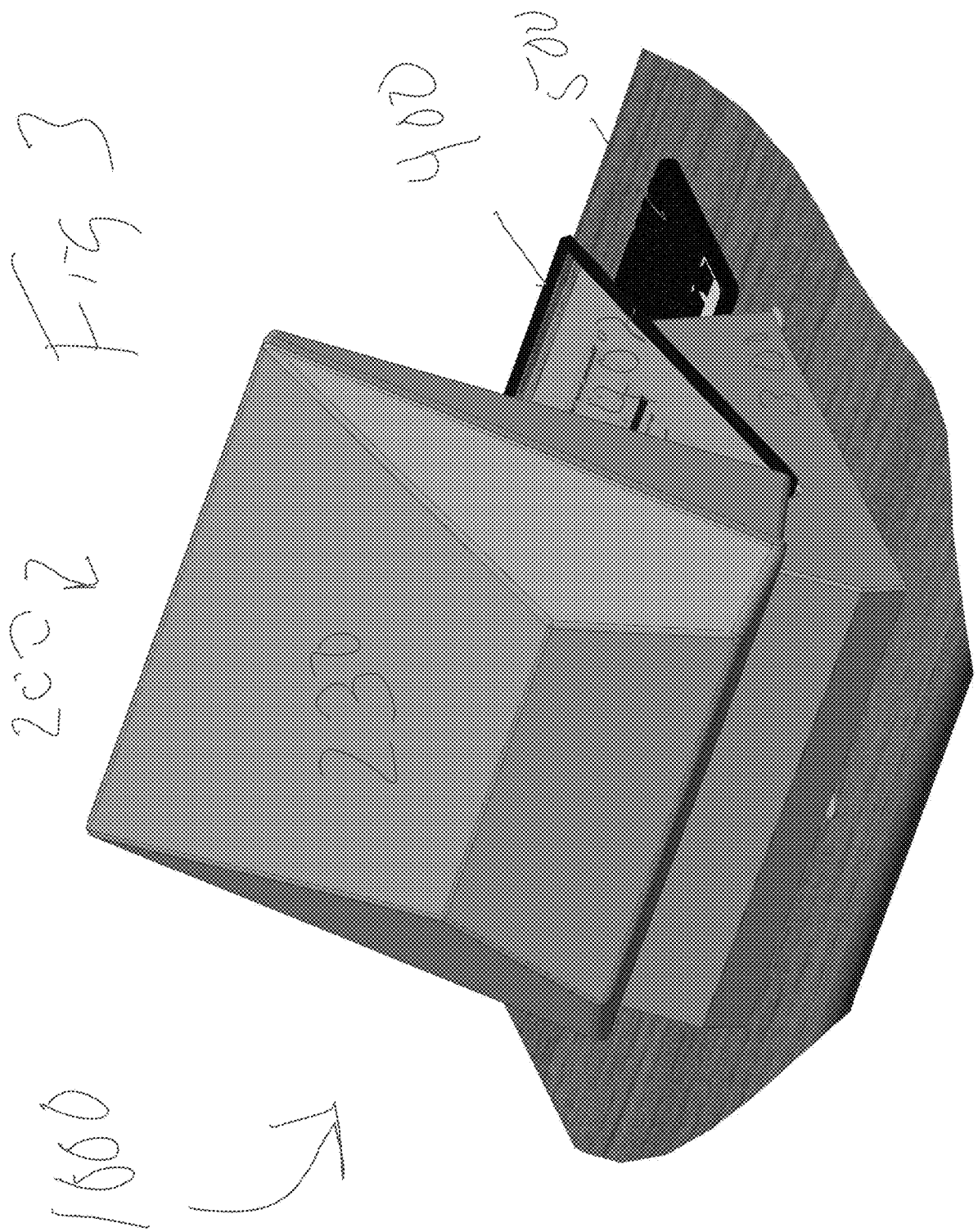

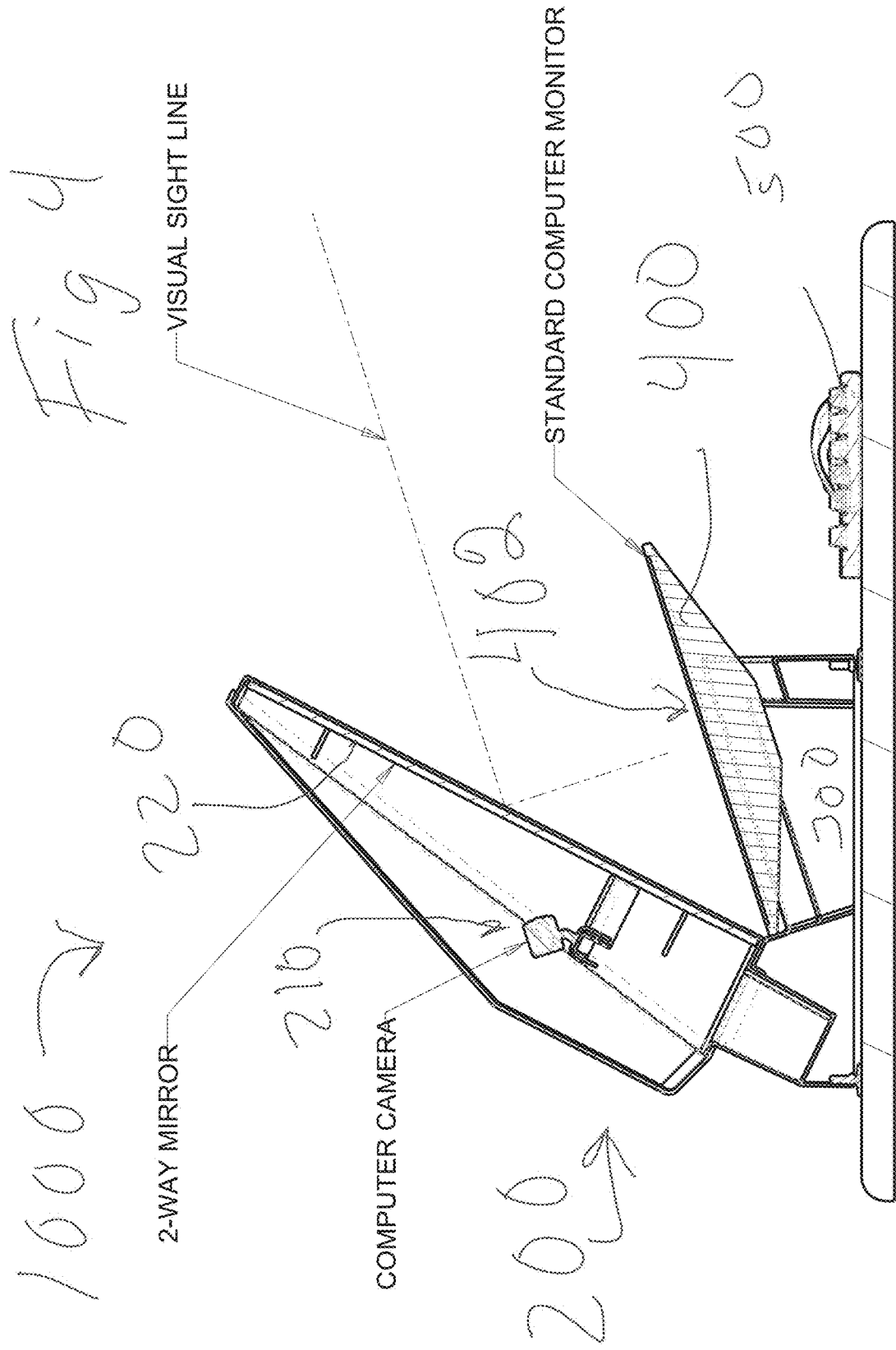

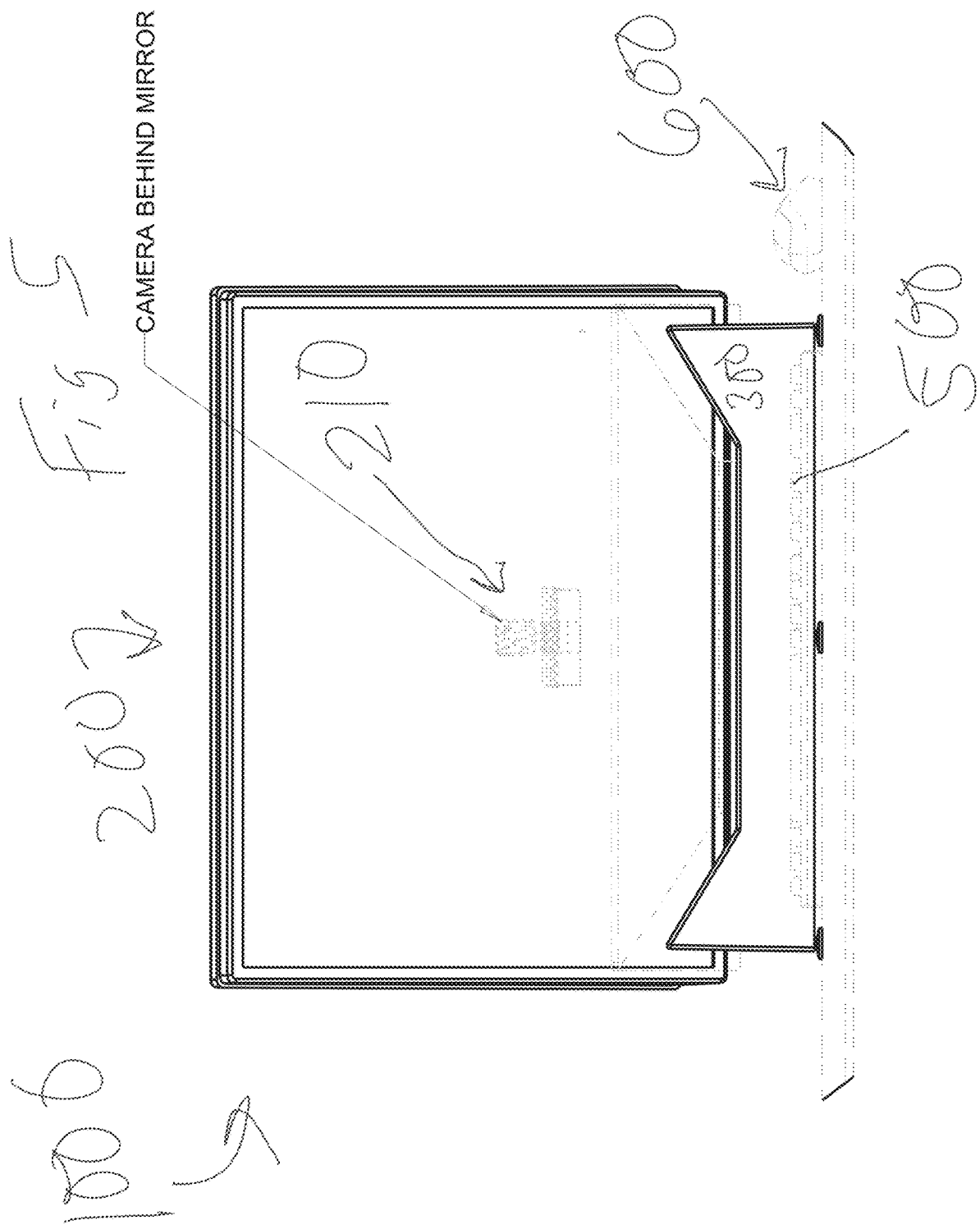

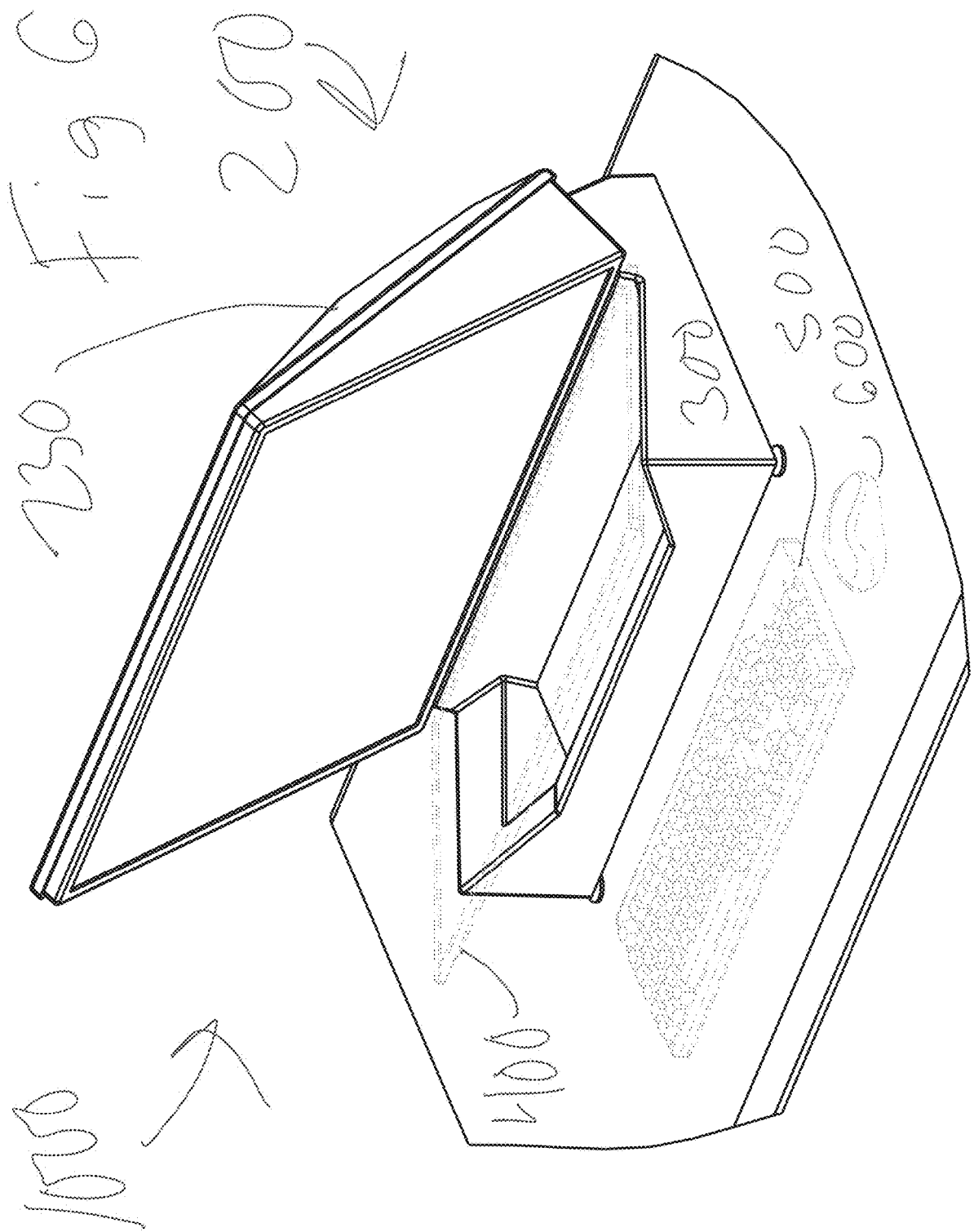

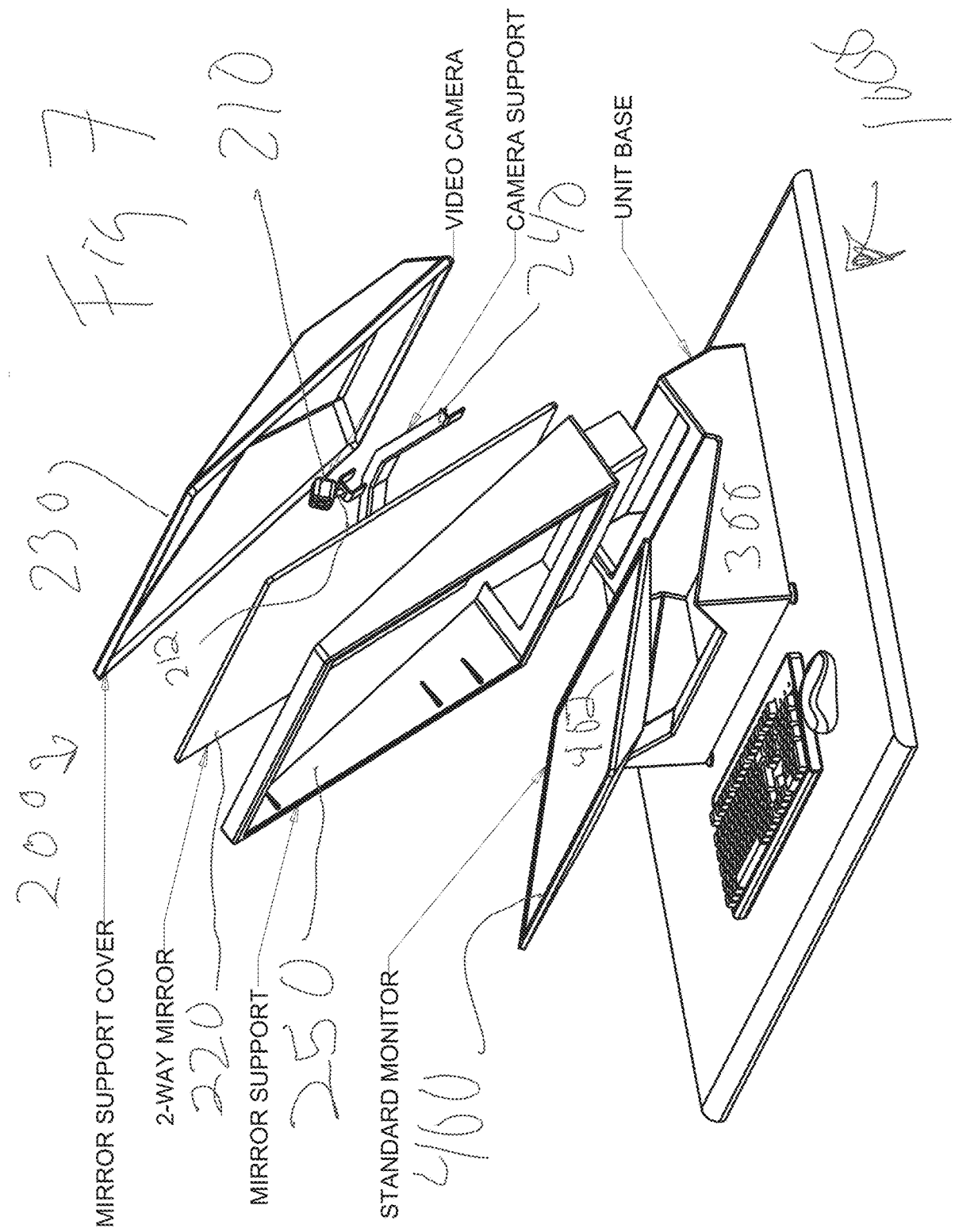

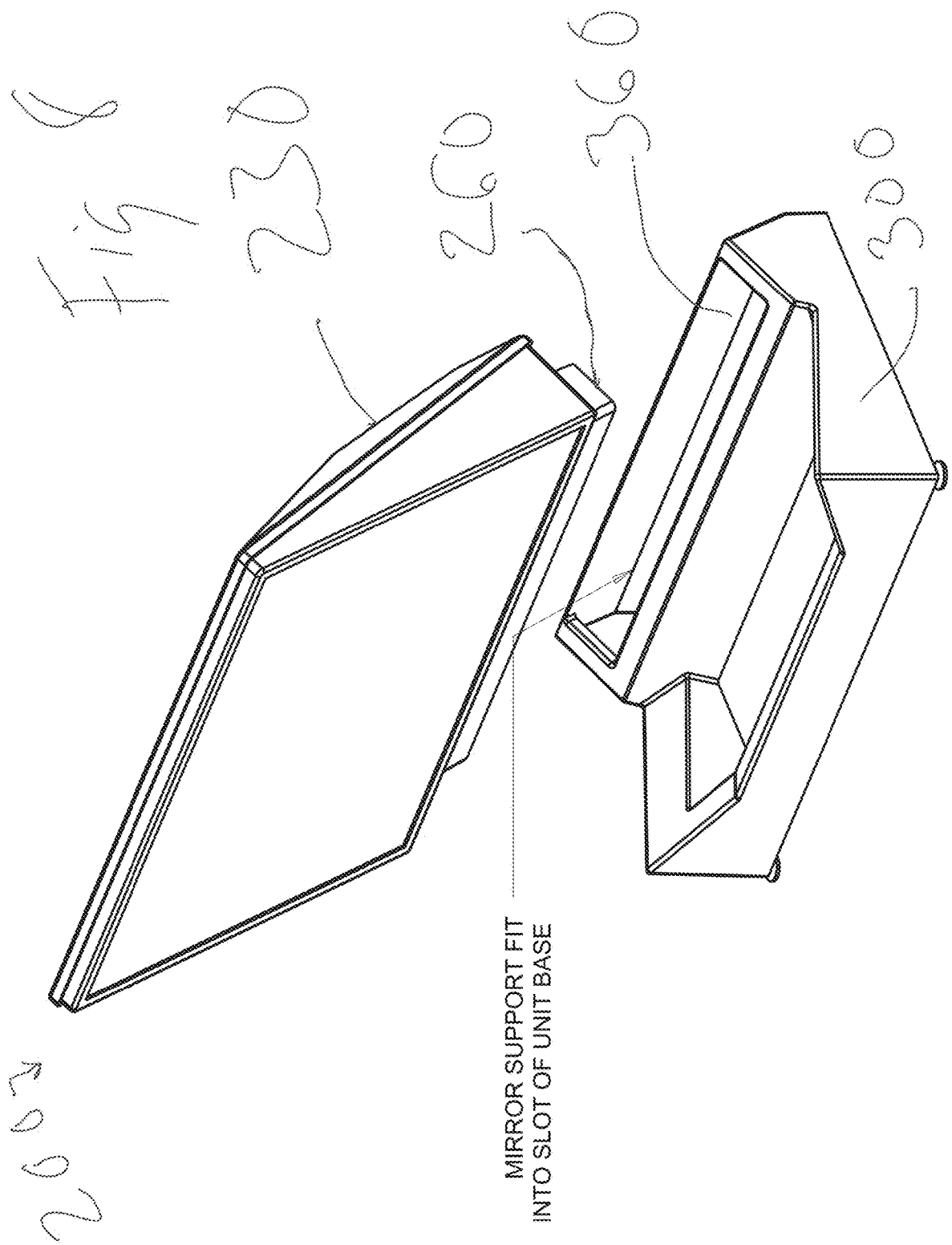

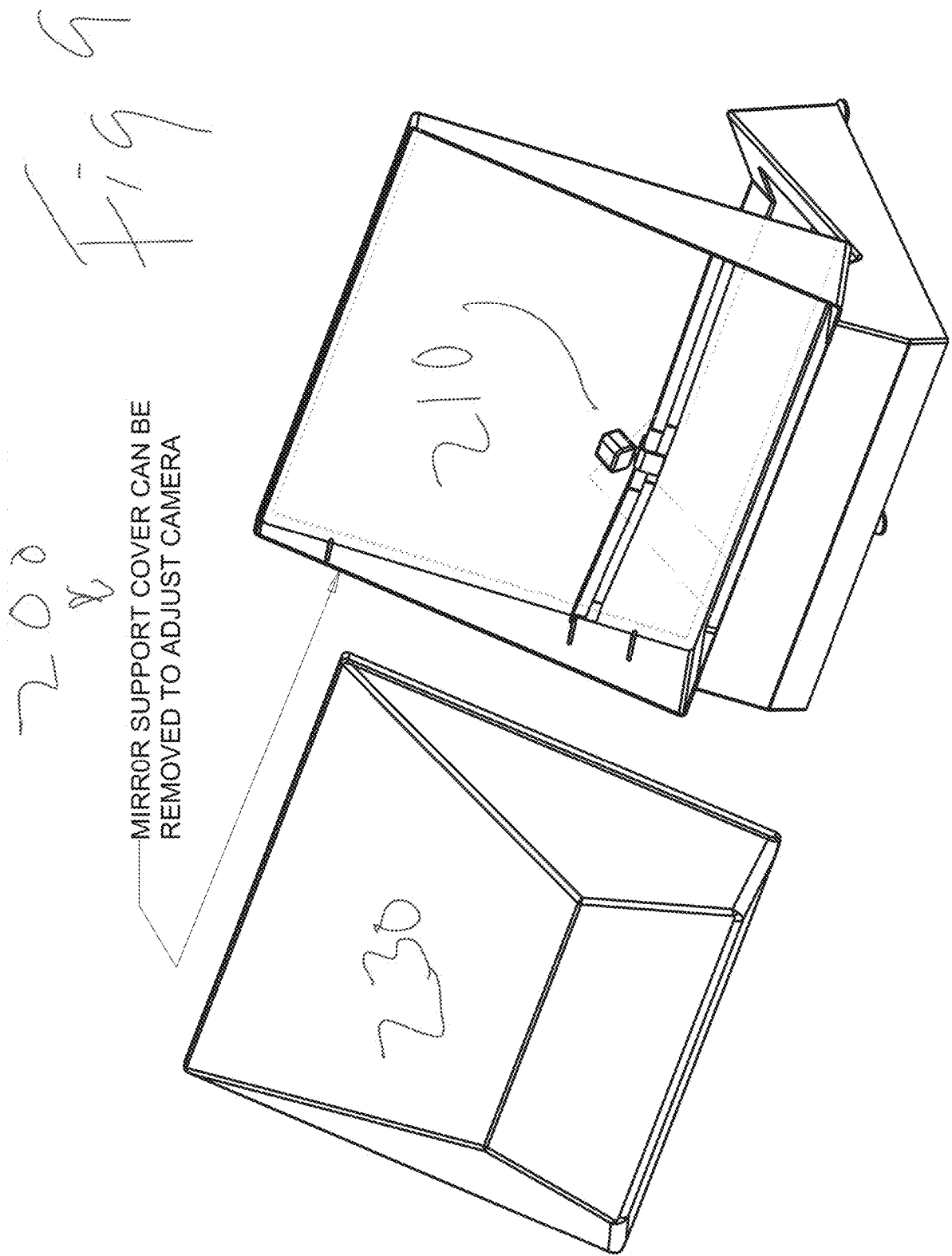

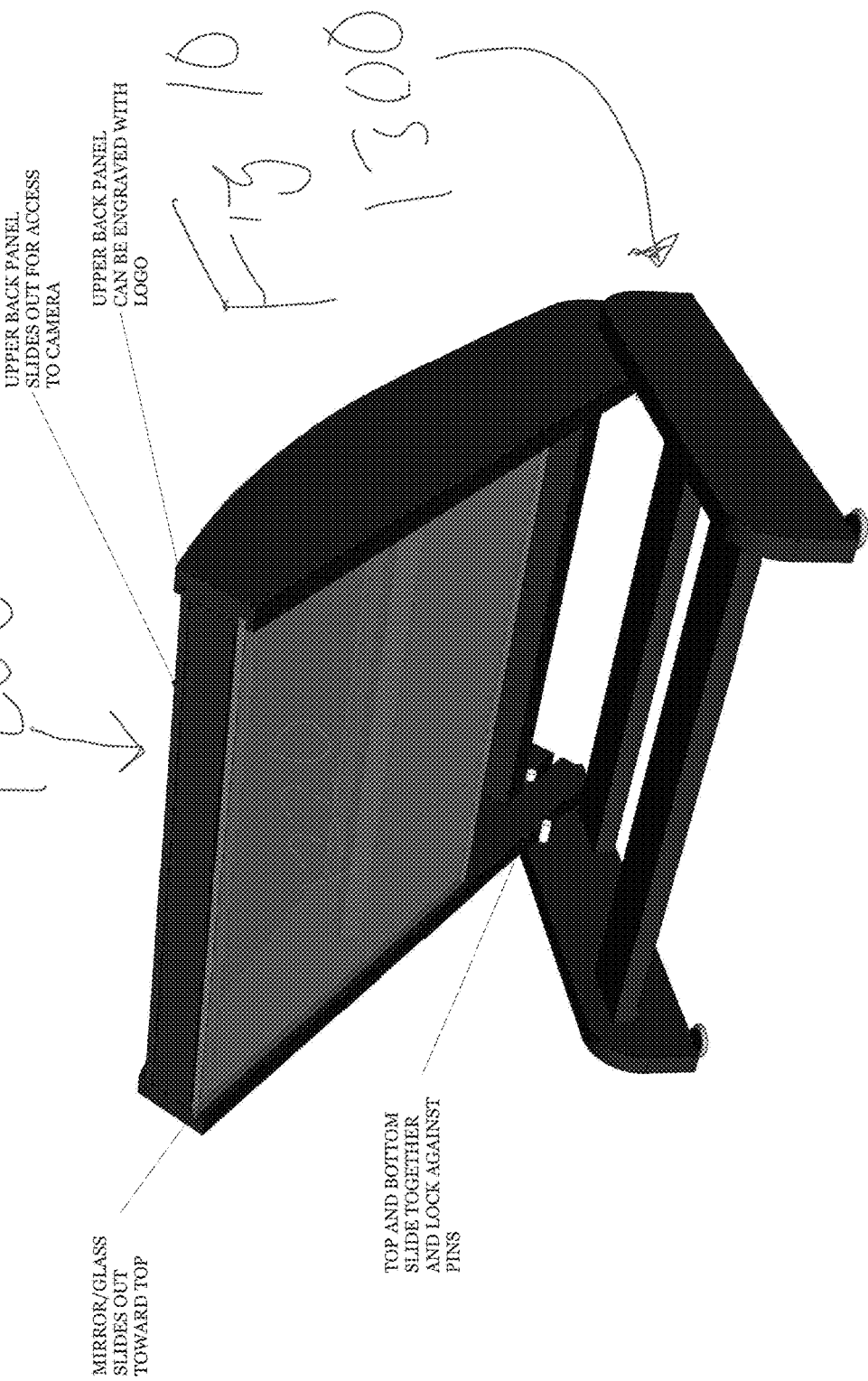

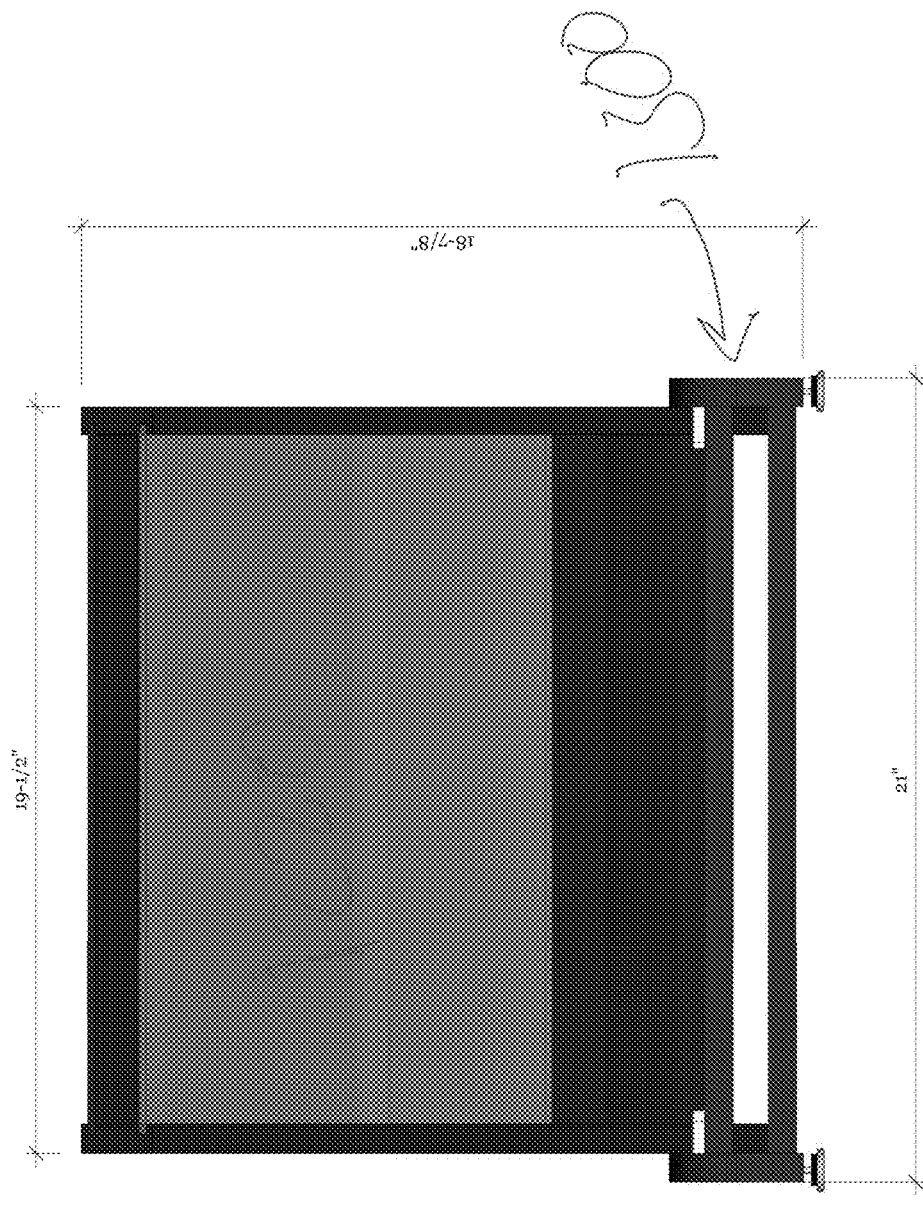

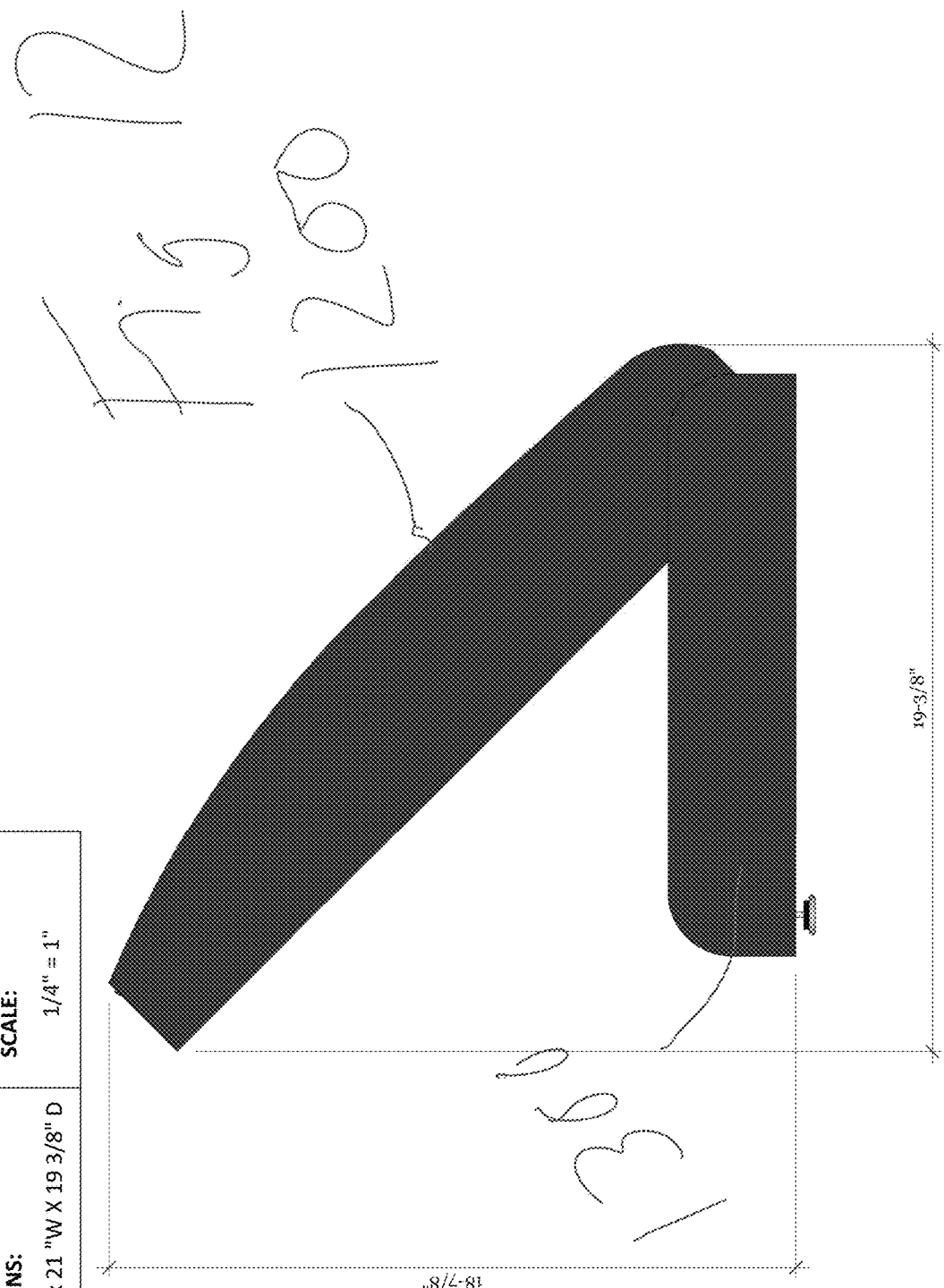

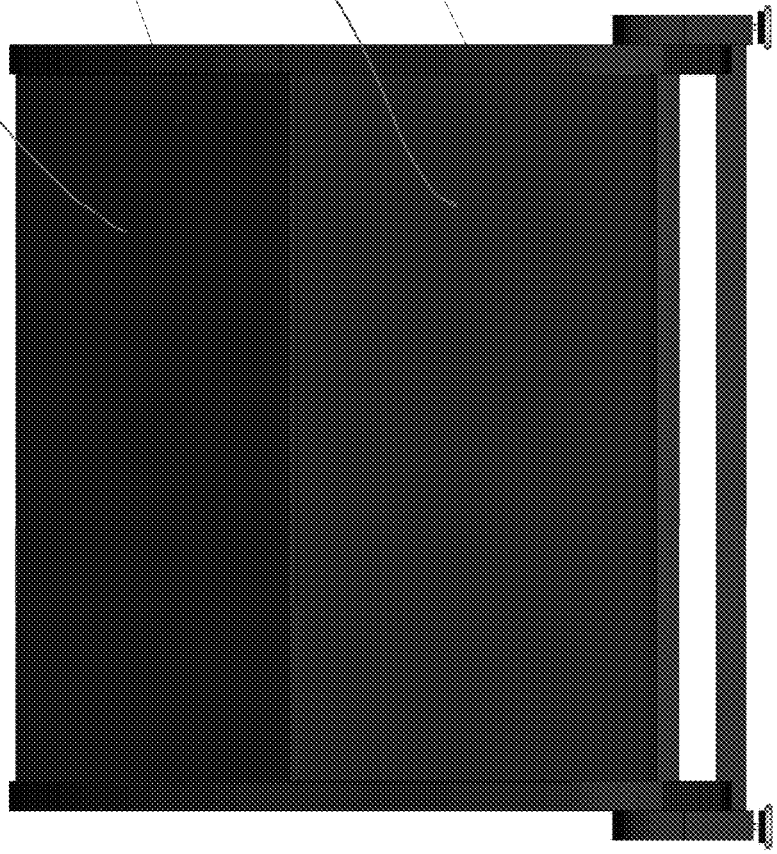

VIRTUAL MEETING SYSTEM AND METHOD FOR FACILITATING EYE CONTACT

CROSS REFERENCE TO RELATED APPLICATIONS

This application claims the benefit of the filing date of the provisional patent application having Ser. No. 62/632,196 filed Feb. 19, 2018, the contents of which are incorporated herein in its entirety by this reference.

FIELD OF THE INVENTION

The present invention generally relates to virtual business meetings via internet linked computers, and more particularly relates to methods and systems for providing rugged portable virtual meetings with equipment for enhancing eye contact.

BACKGROUND OF THE INVENTION

For years, people have been using laptops with cameras in the top bezel, or desktop computers with a web cam perched atop a computer monitor, for two-way video chatting. These systems have enjoyed much use despite the frequent lack of eye contact between the chatting participants.

Business meetings, especially during a time when the participants are not known well by the other, are often routinely still done in face-to-face meetings at the same location so as to build trust and rapport.

While these same location—face-to-face meetings are excellent means to get to know each other; they are expensive and often, for some meetings, too time consuming.

Consequently, there exists a need for improved methods and systems for face-to-face meetings via the internet with enhanced ability for eye contact all done in a reliable and cost efficient manner.

SUMMARY OF THE INVENTION

It is an object of the present invention to provide a system and method for improving eye contact in video meetings in an efficient manner.

It is a feature of the present invention to utilize a rugged portable system with a camera disposed behind a live video image of another person's eyes.

It is an advantage of the present invention to reduce systemic factors leading to reduced eye contact in video meetings.

It is another feature of the present invention to provide a compact dual major subassembly system which can be assembled and disassembled without the need for any tools.

It is another advantage of the present invention to provide quick deployment of the eye contact enhancing system.

The present invention is an apparatus and method for enhancing eye contact in video meetings so as to satisfy the aforementioned needs, provide the previously stated objects, include the above-listed features, and achieve the already articulated advantages. The present invention is carried out in a manner which is free of most systemic eye contact inhibiting configurations.

Accordingly, the present invention is a system comprising:

A system for facilitating eye contact during remote video meetings comprising:

a video meeting top panel subassembly 200 having a first lower portion;

a video meeting base subassembly 300 having a rear portion for mating with said first lower portion;

said video meeting top panel subassembly 200 having:
   a computer camera 210, disposed on a camera support 240;
   a two-way mirror 220 being supported by a mirror support 250 and
   a mirror support cover 230; and said video meeting base subassembly 300 having:
   a plurality of adjustable legs; and
   a structure for engaging and orienting a buyer furnished display equipment 400 so that light emanating from a planar viewing screen 402 on said buyer furnished display equipment 400 is incident upon said two-way mirror 220, so that light originating from said buyer furnished display equipment 400 and reflected toward a viewer on a visual sight line has a predetermined relationship with said planar viewing screen 402.

Accordingly, the present invention is a method comprising the steps of:

A method of facilitating eye contact in virtual meeting systems comprising the steps of:
   provide a top panel structure;
   provide a base structure;
   provide adjustable legs on said base structure;
   attach a camera to said top panel structure;
   place buyer furnished display equipment in the base structure with a planar viewing screen facing upward; and
   operate image transformation software configured to compensate for viewing of a reflected image.

BRIEF DESCRIPTION OF THE DRAWINGS

The invention may be more fully understood by reading the following description of the preferred embodiments of the invention, in conjunction with the appended drawings wherein:

FIG. 1 is a perspective view of the present invention with a display device deployed therein.

FIG. 2 another perspective view of system of FIG. 1 from a different viewpoint.

FIG. 3 is still another perspective view of the system of FIG. 1 from yet another viewpoint.

FIG. 4 is cross-sectional view of the present invention.

FIG. 5 is a view of the present invention without the display device therein which shows in dashed lines the image of the camera behind the two-way mirror.

FIG. 6 is another view of the invention of FIG. 5 which shows the keyboard and mouse in dashed lines.

FIG. 7 is an exploded view of the system of FIG. 1.

FIG. 8 is a partially exploded view of the system of FIG. 1 in two major subassemblies.

FIG. 9 is shows the mirror support cover having been removed.

FIG. 10 is an alternate embodiment of the present invention which has a different mechanism for coupling the two major subassemblies together.

FIG. 11 is another view of the invention of FIG. 10 from a different point of view.

FIG. 12 is yet another view of the invention of FIG. 10 from a yet another different point of view.

FIG. 13 is still another view of the invention of FIG. 10 from a still another different point of view.

DETAILED DESCRIPTION

Though this description details are given of a two major subassembly configuration, it should be understood that different numbers of major subassemblies with different types of components could be used with different connecting schemes and configurations. It is intended that these specific details not limit the scope of the present invention but instead fully enable a best mode of the invention and other variations are intended to be readily understood from the following description and included within the scope and spirit of the present invention.

Now referring to the drawings wherein like numerals refer to like matter throughout, and more specifically referring to FIG. 1, there is shown a system of the present invention which includes a video meeting system 1000 which includes a video meeting top panel subassembly 200 and a video meeting base subassembly 300 with a buyer furnished display equipment 400 disposed therein, which is shown displaying an image on its planar viewing screen 402. In one embodiment of the present invention, the image displayed by buyer furnished display equipment 400 has been transformed by transformation software disposed in the computer providing drive signals to the buyer furnished display equipment 400 so that when looking directly at the surface of buyer furnished display equipment 400, it has been geometrically altered or flipped or transformed from the image that would otherwise have been output by the normal display driving outputs, in the absence of the transformation software. The transformation software results in the video meeting user seeing a geometrically correct image despite the fact that it has been reflected off two-way mirror 220. More specifically, when looking at FIG. 1, there appears to be a word displayed on edge of the display proximal to the video meeting system user, which from left to right includes the letters of the word CLICKBRANCH, but the letters appear individually flipped.

Now referring to FIG. 2, there is shown a view of the system of FIG. 1 as seen from the location of a system user. The text of the word CLICKBRANCH is clearly legible on the two-way mirror 220.

Now referring to FIG. 3, the system of FIG. 1 is shown from an alternate viewpoint where there is a direct view of the buyer furnished display equipment 400, where the letters are not legible because without being reflected off the two-way mirror 220, the transformation software has altered the display.

Now referring to FIG. 4, there is shown a cross-sectional view of the system of FIG. 1 with the computer camera 210 shown disposed behind or distal of the viewing surface of two-way mirror 220. The computer camera 210 is shown pointed along a visual sight line which is ideally directed to the eyes of the system user. Computer camera 210 can be moved around to accommodate different sight lines for different viewers. This movement can be manual or it may be automated by a computer aided directional adjustment mechanism. In some more expensive embodiments, the camera may be equipped with a bright pulsating light which is turned on turning setup so that the system user looks at the bright pulsating light and the computer aided directional adjustment mechanism adjusts so that the visual sight line is directed directly into the eyes of the user looking at the bright pulsating light. Facial recognition software is used to determine the location of the eyes of the system user and the computer aided directional adjustment mechanism is adjusted into perfect alignment. This process can be repeated through the virtual video meeting either with or without the bright pulsating light. Much of the technology described, with respect to this adjustment, can be variation of eye tracking software which has been used for fighter pilots for many years.

Now referring to FIG. 5, there is shown a view of the invention of FIG. 1 where the computer camera 210 can be easily seen through the two-way mirror 220 when no image is being output by buyer furnished display equipment 400 (shown here in dashed lines).

Now referring to FIG. 6, there is shown a view of the present invention when the buyer furnished display equipment 400 is not disposed in the video meeting base subassembly 300.

Now referring to FIG. 7, there is shown an exploded view of the system of FIG. 1 where the computer camera 210 is shown without any wires. It should be understood that it could be battery operated and be wireless or it could be connected by a power/data cable to the computer (not shown) which provides drive signals to buyer furnished display equipment 400. Computer camera 210 could be coupled to camera support 240 via a ball in socket coupler 212, which could have electronic components inside the housing of computer camera 210 or could be a self contained remote controlled independent electro-mechanical directional coupler, depending upon the particular needs of a specific application.

Now referring to FIG. 8, there is shown a configuration between video meeting base subassembly 300 with its slot 360 and video meeting top panel subassembly 200 with its male portion 260, which permits easy assembly of these subassemblies.

Now referring to FIG. 9, there is show a view of the system of claim 1 where the computer camera 210 is shown without any wires or bulky directional adjustment mechanism. It should be understood that corded or cordless systems are a matter of design choice depending upon the price point for any particular application.

Now referring to FIG. 10, there is an alternated embodiment of the present invention, which has video meeting top panel subassembly 1200 with the two-way mirror 1220 and a video meeting base subassembly 1300.

Now referring to FIGS. 11 and 12, there are shown alternate views.

Now referring to FIG. 13, there is shown sliding panel 1270, fixed panel 1280, which provide for access similar to that of mirror support cover 230 of FIG. 1.

The method of the present invention can be performed with the above described systems but other systems could be employed to carry out the innovative steps of the present inventive method. The system is described below with respect to meetings between bank personnel and bank customers, because it is believed that some of the benefits of the present invention will be most apparent in this context. However, this reference to banking is not intended to limit the invention to such uses.

The present invention is a compact rugged portable desktop system and method for overlaid face image display and face image capture to facilitate eye contact in face-to-face communication with remote banking customers using video communication with well known and varied customer side pc systems and methods.

Remote business meetings can be enhanced using the present invention. A very close personal contact can be achieved with the present invention which is far superior to what is currently available with typical equipment. For example, laptops with built-in webcams at the center of the top display bezel are quite common, but when two are used for a video meeting there is always separation of the camera from the image that the person is viewing. This eliminates the ability for the banking customer to have direct eye contact with the banker's eyes.

The present invention is designed to work with a commercial off the shelf laptop, computer tablet or buyer furnished display equipment 400 with slight modifications to their structures for supporting the monitor (e.g. stands or backsides for mounting on walls) the buyer furnished display equipment 400 is laid in the present invention so that the screen faces upward and is visible on the two-way mirror 220. The computer camera 210 is behind the two-way mirror 220, like in a typical teleprompter. The banker will enter a video meeting such as Skype, Google Hangouts, or preferably with software tailored to facilitate the method of operation discussed below. The customer does nothing different than they would normally do. However, the banker will be provided with the system of the present invention and will be trained to operate it so as to maximize the face-to-face experience that the banking customer receives.

The banker will take the window in which the customer's face is presented on the buyer furnished display equipment 400 and move it so that center of the cross-hairs (not shown), which are on the two-way mirror 220 (either affixed or on a removable film) and are centered on the lens of the computer camera 210 and are located between the banking customers eyes. Now the banker will look directly at the enlarged cross hairs and the customer's perception of looking directly into the eyes of the banker is achieved. The cross-hairs would be enlarged to allow the banker to quickly re-focus on the exact camera lens location (which will not be visible to the banker when the buyer furnished display equipment 400 is generating an image) if the banker needs to look away.

The system of the present invention is made using the following:

Step One:
Provide a video meeting top panel subassembly 200 or the like;

Step Two:
Provide a video meeting base subassembly 300 or the like;

Step Three:
Provide adjustable legs on video meeting base subassembly 300; (optional).

Step Four:
Attach computer camera 210 to the camera mount of video meeting top panel subassembly 200;

Step Five:
Place buyer furnished display equipment 400 in the video meeting base subassembly 300 with the display screen facing upward;

Step Six:
Operate the Monitor/laptop/Tablet using software configured to facilitate the operation of the system and method of the present invention. Including image transformation software to compensate for viewing of a reflected image;

Step Seven:
Adjusting the orientation of the computer camera 210 (either manually or electronically (wired or wireless; automatically with eye tracking systems or by manual interaction with the tablet, laptop or compute and an electronic directional adjustment system; coupled to the computer camera 210).

Throughout this description, reference is made to buyer furnished display equipment because it is believed that the beneficial aspects of the present invention would be most readily apparent when used in connection with buyer furnished display equipment; however, it should be understood that the present invention is not intended to be limited to buyer furnished display equipment and should be hereby construed to include other types of dedicated or embedded displays and computers as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A system for facilitating eye contact during remote video meetings comprising:
    a video meeting top panel subassembly having a first lower portion;
    a video meeting base subassembly having a rear portion for mating with said first lower portion;
    said video meeting top panel subassembly having:
        a computer camera, disposed on a camera support;
        a two-way mirror being supported by a mirror support and
        a mirror support cover; and
    said video meeting base subassembly having:
        a plurality of adjustable legs; and
        a structure for engaging and orienting a buyer furnished display equipment so that light emanating from a planar viewing screen on said buyer furnished display equipment is incident upon said two-way mirror, so that light originating from said buyer furnished display equipment and reflected toward a viewer on a visual sight line has a predetermined relationship with said planar viewing screen.

2. The system of claim 1 wherein said visual sight line is not exactly parallel with said planar viewing screen.

3. The system of claim 2 wherein said visual sight line is substantially parallel with said planar viewing screen.

4. The system of claim 1 wherein said computer camera has a central axis of orientation which is not exactly parallel with said planar viewing screen.

5. The system of claim 4 wherein said central axis of orientation is substantially parallel with said planar viewing screen.

6. The system of claim 1 wherein said computer camera is adjustable with respect to said visual sight line.

7. The system of claim 6 where said computer camera is configured with a means for changing said central axis of orientation in response to received electronic commands.

8. The system of claim 6 where said computer camera is configured with a ball in a socket coupler.

9. The system of claim 1 wherein said plurality of adjustable legs are configured to make adjustments for a viewer's eye location.

10. The system of claim 9 wherein said relationship between said visual sight line and said planar viewing screen is fixed.

11. A method of facilitating eye contact in virtual meeting systems comprising the steps of:
    provide a top panel structure;
    provide a base structure;

provide adjustable legs on said base structure;
attach a camera to said top panel structure;
place buyer furnished display equipment in the base structure with a planar viewing screen facing upward;
operate image transformation software configured to compensate for viewing of a reflected image; and
wherein said top panel structure includes a removable mirror support cover to provide access to said camera.

12. The method of claim 11 further comprising the steps of:
removing said removable mirror support cover and making adjustments to said camera.

13. A method of facilitating eye contact in virtual meeting systems comprising the steps of:
provide a top panel structure;
provide a base structure;
provide adjustable legs on said base structure;
attach a camera to said top panel structure;
place buyer furnished display equipment in the base structure with a planar viewing screen facing upward;
operate image transformation software configured to compensate for viewing of a reflected image; and
providing a visual alignment reference to aid in placing an image of a remotely located meeting participant directly in a line of sight between the camera and a location of a viewer's eyes.

14. The method of claim 13 further comprising changing a central axis of orientation of the camera to facilitate eye contact as the location of a viewer's eyes may change as the viewer shift at least one of head and body orientation and location.

* * * * *